United States Patent Office 2,870,233
Patented Jan. 20, 1959

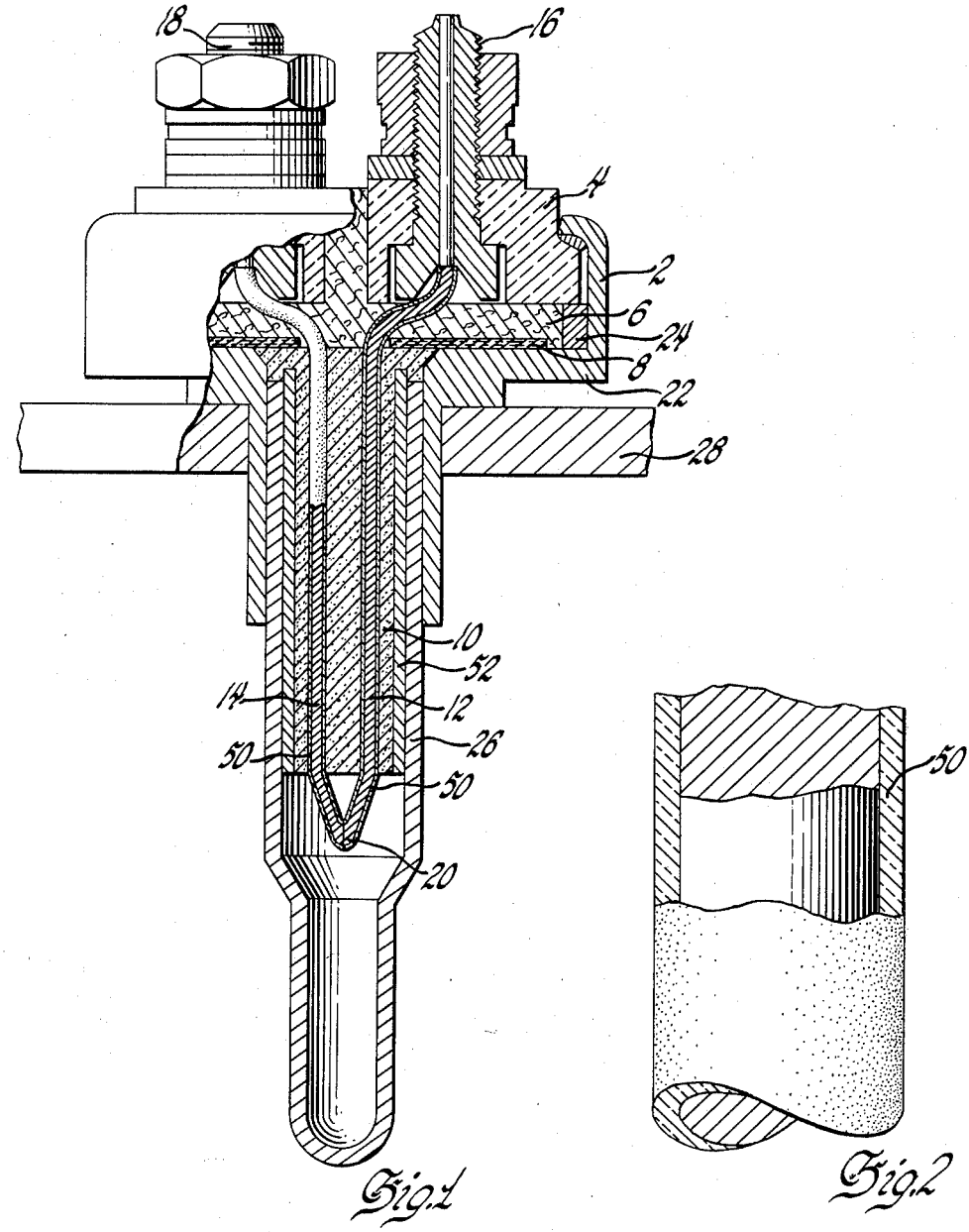

2,870,233

THERMOCOUPLE

Richard L. Comer, Grand Blanc, Mich., assignor to General Motors Corporation, Detroit, Mich., a corporation of Delaware Application February 11, 1957, Serial No. 639,384

11 Claims. (Cl. 136—4)

This invention relates to thermocouples of the type having a bimetal joint the E. M. F. of which is proportional to temperature. Such thermocouples are used for the measurement and indication of relatively high temperatures in gas turbine engines and the like. The invention is especially advantageous in thermocouples wherein the bimetal joint is formed by two dissimilar metal wires which extend through and are supported by a packed shock-resistant insulating material such as magnesia.

It is highly desirable and frequently essential that a thermocouple be adapted to provide a very minimum of lag between the time of a change in temperature condition and the time at which the thermocouple registers or indicates such change. This is particularly true for thermocouples used in aircraft jet engines since it is obviously necessary that the pilot of the aircraft be made aware of any change in temperature almost immediately. To accomplish the shortest time lag, it is important that the heat sensitive bimetal junction of the thermocouple be exposed to the hot gases within the gas turbine engine rather than enclosed by a protective shield or casing. However, such exposure results in other difficulties. For example, corrosion of the thermocouple wires from direct contact with the gases may be considerable, thereby greatly reducing the useful life of the thermocouple. Also, where packed ceramic powder is utilized as an insulating support for the thermocouple wires, such powder, when not enclosed or shielded, tends to absorb moisture and other contaminants, particularly during periods when the gas turbine engine is idle, this to the extent that its electrical resistance is lowered below permissible limits thereby resulting in a short circuit between those portions of the thermocouple wires surrounded by such insulation material.

In accordance with the present invention, a highly improvide thermocouple having a very short response time is accomplished by providing the thermocouple wires which form the heat sensitive junction with a thin coating of a high heat and corrosion resistant vitreous material. The thin coating adequately protects and electrically insulates the wires under all operating conditions but does not perceptibly increase the response time.

The various advantages of the invention will appear more clearly from the following description of preferred embodiments and from the drawings in which:

Figure 1 shows a side view in partial section of a thermocouple incorporating the invention; and Figure 2 shows an enlarged sectional view of a portion of one of the thermocouple wires in Figure 1.

Referring now to Figure 1, the thermocouple shown comprises a metal housing 2 having secured therein electrical insulator bodies 4, 6, 8 and 10 which serve to support and insulate a pair of thermocouple wires, shown at 12 and 14. Insulator 4 is preferably a high heat and thermal shock resistant ceramic block of high alumina composition, insulator 6 a hardened ceramic cement, insulator 8 a mica disc, and insulator 10 a tightly packed ceramic powder such as magnesium oxide. The upper ends of the wires are secured to electrical terminals 16 and 18 and the lower ends extend to the exterior of packed insulator member 10 where they are welded together to form the heat sensitive junction 20. One of the wires may be of about 95% nickel, the remainder aluminum, silicon and manganese, and the other of about 90% nickel and 10% chromium. Frequently two pairs of wires are used to form two heat sensitive junctions, thereby producing two parallel thermocouple circuits. The metal housing 2 is cylindrical in shape, having an upper portion of larger diameter and a lower portion of smaller diameter, the connecting wall between said portions forming an internal annular shoulder 22. Positioned within the housing between the shoulder 22 and insulator 4 is a bronze ring 24 to compensate for differences in coefficients of expansion and provide a continuously tight fit between the parts. A tubular metal member 26 is brazed within and forms an extension to the lower tubular portion of the metal housing 2 and is provided with a plurality of gas inlet openings and at least one outlet opening to allow the hot gases to pass in contact with the heat sensitive junction 20. The chief purpose for this member 26 is to route samples of gas from various levels to the heat sensitive junction, this by way of the plurality of gas inlet openings. A suitable support flange 28 is provided in order that the thermocouple may be secured in its operating position and location such, for example, as in the combustion chamber wall of an aircraft gas turbine engine.

Each of the terminals 16 and 18 is provided with a through-bore through which one of the thermocouple wires extends, the top of the thermocouple wire being welded to the top of the screw thereby assuring good electrical contact. The thermocouple wires are bent inwardly from the terminals and then downwardly extending through the packed insulator member 10, and joined as by welding externally thereof to form the heat sensitive junction 20.

The above and other structure shown in the accompanying drawing is the same as that described in greater detail, particularly with respect to the arrangement of insulator members and the manner in which they are secured within the shell, in copending United States application 639,465, filed concurrently herewith in the name of Gustav F. Rademacher.

The features of the device shown in which the present invention particularly relates are the structure and the arrangement and composition of the parts forming the assembly of the thermocouple wires with packed insulator 10. In accordance with the invention and as can best be seen in Figure 2, each of the wires has a thin coating 50 of a high heat and corrosion resistant vitreous material. This coating extends over the entire surface of the wires and the welded junction 20 between them, up to the top of insulator 10 or, if desired, to the top of insulator cement 6, as shown, the uppermost portion of the wires within the terminal screws being left uncoated for good electrical contact. The coated wires are positioned to extend through a metal tube 52 which is tightly packed with the powdered ceramic material 10, preferably magnesium oxide. It is to be particularly noted that the thermocouple wires are preferably coated not only over their exposed portions below the packed insulator 10, but also over those portions within and surrounded by the packed insulation. This assures good electrical insulation between the wires even though the packed ceramic 10 may absorb moisture of other contaminants which reduce its electrical resistance.

It is necessary that the protective coating for the wires have high temperature and corrosion resistance and good adherence throughout a wide temperature range. We have found that particularly suitable coating materials are those showing chemical analyses within the following range: 40% to 50% $SiO_2$, 15% to 25% $Al_2O_3$, 10% to 15% alkaline oxide, principally $Na_2O$, 10% to 18% $B_2O_3$, 2% to 4% alkaline earth oxide, principally calcium oxide, up to 3% $TiO_2$, up to 2% $Mn_3O_4$, plus small amounts, up to about 1% each, of $Fe_2O_3$ and $Co_3O_4$. Small amounts of CuO and PbO may also be present. The following are examples, in their raw batch form, of specific coating materials which show analyses, after firing, within the above range:

Coating #1:                            Parts by weight
- XG-203 frit[1] ................................ 15
- Dried ground coat enamel[1] ................. 65
- A-10 calcined alumina[2] ..................... 20
- Kentucky ball clay ........................... 5
- M-7 clay ..................................... 5
- Borax ........................................ .25
- Citric acid crystals ......................... .05
- Water ........................................ 50

Coating #2:
- XG-203 frit .................................. 25
- Dried ground coat enamel .................... 60
- A-10 calcined alumina ....................... 15
- Kentucky ball clay ........................... 5
- M-7 clay ..................................... 5
- Borax ........................................ .25
- Citric acid crystals ......................... .05
- Water ........................................ 50

Coating #3:
- XG-203 frit .................................. 20
- 2501 frit[1] ................................. 30
- 2502 frit[1] ................................. 30
- A-10 calcined alumina ....................... 20
- Kentucky ball clay ........................... 5
- M-7 clay ..................................... 5
- Borax ........................................ .25
- Citric acid crystals ......................... .05
- Water ........................................ 50

Coating #4:
- XG-203 frit .................................. 25
- 2501 frit .................................... 30
- 2502 frit .................................... 30
- A-10 calcined alumina ....................... 15
- Kentucky ball clay ........................... 5
- M-7 clay ..................................... 5
- Borax ........................................ .25
- Citric acid crystals ......................... .05
- Water ........................................ 50

[1] Presently commercially available from the Ferro Corp.
[2] Presently commercially available from the Aluminum Company of America.

The following table shows typical chemical analyses (in terms of percent by weight) of component materials and of the coatings of Examples 1–4:

roughened surface. The wires are welded together to form the heat sensitive junction as shown at 20 and then coated with a ceramic slurry such as one of those of the preceding examples, by dipping, spraying, brushing or the like, preferably the former. The amount of slurry applied should be sufficient to provide a final vitrified coating, after firing, of about 3 to 5 mills thickness. This can be controlled in accordance with the usual practice, by the amount of water in the slurry which determines its consistency. In the examples given above, the amount of water present is sufficient to provide the desired coating thickness by means of a single dipping operation. The excess slurry is allowed to drain and the coated wires are then oven-dried at approximately 180° F. for five minutes or so, after which they are fired at from 1700° to 1800° F. for from 15 to 25 minutes to thereby vitrify the coating to a hard, dense, gas-impervious film of about from 3 to 5 mills thickness. It is understood, of course, that the upper portions of the wires, which are subsequently to be secured to the electrical terminals, are left uncoated.

After the coated wires have completely cooled, they are positioned to extend through metal tube 52 and the powdered insulating material 10 is then tightly packed into the tube about the wires as by tamping, swaging or the like. A suitable jig may be used to support the wires in proper spaced relation to the tube during this tamping operation. The terminals, such as shown at 30, are then secured to the upper ends of the thermocouple wires and the assembly of other parts completed.

If desired, the welding operation to form the heat sensitive junction may be performed after the assembly of the wires, packed insulation and tube 52 has been completed. Using this procedure, only those portions of the thermocouple wires to be enclosed within the packed insulating material are initially coated as by the above-specified procedure. Then after the wires are within the packed insulating material 10, they are welded together to form the heat sensitive junction 20 after which those portions of the wires exterior of the packed insulating material, including the heat sensitive junction, are coated, dried and fired as described. This last-mentioned procedure is useful in the instance that it is desired to use, in the practice of this invention, the structure and process as described in patent application Serial No. 340,223, Robert W. Smith, filed March 4, 1953, wherein a ceramic plug is glass bonded within the end of the tube containing the packed insulating material to provide a gas-tight seal.

It will be understood that various changes and modifications may be used, all within the full and intended scope of the claims which follow.

| Material | $SiO_2$ | CuO | PbO | $Al_2O_3$ | $TiO_2$ | $Fe_2O_3$ | CaO | NiO | $Co_3O_4$ | $Na_2O$ | $K_2O$ | $Mn_3O_4$ | MgO | $B_2O_3$ |
|---|---|---|---|---|---|---|---|---|---|---|---|---|---|---|
| 2501 Frit | 57.12 | .15 | .01 | 1.04 | 2.64 | .01 | 3.70 | .01 | 1.66 | 15.25 | .91 | 2.46 | .14 | 14.60 |
| 2502 Frit | 50.94 | .10 | .01 | 1.54 | 3.74 | .01 | 4.14 | .01 | 1.01 | 15.03 | 1.78 | 2.08 | .13 | 19.32 |
| XG-203 Frit | 50.91 | .23 | .01 | 1.10 | 3.30 | .01 | 4.03 | .01 | .98 | 15.11 | 1.06 | 1.91 | .39 | 20.73 |
| Dried Ground Coat Enamel | 52.95 | .14 | .05 | 2.74 | 2.48 | .72 | 2.58 | | 1.23 | 14.03 | 1.15 | 1.04 | .42 | 20.47 |
| A-10 Calcined Alumina | .06 | | | 99.74 | | .04 | | | | .15 | | | | |
| Kentucky Ball Clay | 51.65 | | | 31.24 | 1.72 | 1.17 | .20 | | | .58 | .36 | | .50 | |
| M-7 Clay | 47.8 | | | 36.3 | 1.2 | 0.7 | | | | 0.6 | 0.9 | | | |
| Borax | | | | | | | | | | 16.3 | | | | 36.5 |
| Coating #1 | 43.23 | .11 | .02 | 23.21 | 2.07 | .51 | 2.19 | | .87 | 10.58 | .89 | .89 | .33 | 15.16 |
| Coating #2 | 45.48 | .12 | .02 | 18.60 | 2.26 | .47 | 2.36 | | .90 | 11.32 | .92 | 1.01 | .34 | 16.13 |
| Coating #3 | 43.55 | .10 | | 22.24 | 2.48 | .08 | 2.90 | | .95 | 11.00 | .99 | 1.43 | .17 | 13.14 |
| Coating #4 | 47.73 | .12 | | 18.44 | 2.74 | .08 | 3.20 | | .99 | 12.35 | | 1.75 | .19 | 12.35 |

The following method may be used to manufacture improved thermocouples in accordance with the invention:

First, to insure good adherence of the coating to the thermocouple wires, it is advantageous to anneal the wires, prior to coating, for about fifteen minutes at approximately 1600° F. after which they should be preferably sand blasted or otherwise abraded to provide a clean,

I claim:

1. A thermocouple comprising a metal tube containing a tightly packed powdered insulating material, a pair of metal wires extending through said insulating material, the upper ends of said wires being electrically connected to terminals and the lower ends of said wires being joined together externally of said insulating material to form a heat sensitive junction, and a thin, continuous heat and corrosion resistant coating of vitreous material on the exposed portions of said wires external of said insulating material and on those portions of said wires within said insulating material.

2. A thermocouple comprising a metal tube containing a tightly packed powdered insulating material, and a pair of metal wires extending through said insulating material joined together externally thereof to form a heat sensitive junction, at least the exposed portions of said wires external of said insulating material being provided with a continuous heat and corrosion resistant thin coating of vitreous material, said vitreous material showing on analysis from about 40% to 50% $SiO_2$, 15% to 25% $Al_2O_3$, 10% to 15% alkali metal oxide, 10% to 18% $B_2O_3$, 2% to 4% alkaline earth metal oxide and the remainder substantially all $TiO_2$, $Mn_3O_4$, $Fe_2O_3$ and $Co_3O_4$.

3. In a thermocouple of the type comprising a pair of dissimilar metal wires joined to form a heat sensitive junction, the improvement comprising a thin heat and corrosion resistant coating on the exposed portions of said wires, said coating showing on analysis from about 40% to 50% $SiO_2$, 15% to 25% $Al_2O_3$, 10% to 15% alkali metal oxide, 10% to 18% $B_2O_3$, 2% to 4% alkaline earth oxide, up to 3% $TiO_2$, up to 2% $Mn_3O_4$, and up to 1% each of $Fe_2O_3$ and $Co_3O_4$.

4. In a thermocouple of the type comprising a pair of dissimilar metal wires joined to form a heat sensitive junction, the improvement comprising a thin heat and corrosion resistant coating on the exposed portions of said wires, said coating showing on analysis from about 40% to 50% $SiO_2$, 15% to 25% $Al_2O_3$, 10% to 15% alkali metal oxide and 10% to 18% $B_2O_3$.

5. A thermocouple comprising a metal housing, an insulator block within the upper end of said housing having a pair of electrical terminals secured therein, a metal tube forming the lower end of said housing and containing a tightly packed powdered insulating material, and a pair of metal wires electrically connected to said terminals extending through said insulating material and joined together externally thereof to form a heat sensitive junction, said wires being provided with a thin heat and corrosion resistant coating of vitreous material showing on analysis from about 40% to 50% $SiO_2$, 15% to 25% $Al_2O_3$, 10% to 15% alkali metal oxide, 10% to 18% $B_2O_3$, 2% to 4% alkaline earth metal oxide and the remainder substantially all $TiO_2$, $Mn_3O_4$, $Fe_2O_3$ and $Co_3O_4$.

6. A thermocouple comprising a metal tube containing a tightly packed powdered insulating material, and a pair of metal wires extending through said insulating material joined together externally thereof to form a heat sensitive junction, at least those portions of said wires within said insulating material being provided with a thin, continuous heat and corrosion resistant coating of vitreous material.

7. A thermocouple as defined in claim 6 wherein the coating of vitreous material shows on analysis from about 40% to 50% $SiO_2$, 15% to 25% $Al_2O_3$, 10% to 15% alkali metal oxide, 10% to 18% $B_2O_3$ and 2% to 4% alkaline earth metal oxide.

8. A thermocouple comprising a metal tube containing a tightly packed powdered insulating material, and a pair of metal wires extending through said insulating material joined together externally thereof to form a heat sensitive junction, those portions of said wires within said insulating material being provided with a continuous heat and corrosion resistant thin coating of vitreous material, said vitreous material showing on analysis from about 40% to 50% $SiO_2$, 15% to 25% $Al_2O_3$, 10% to 15% alkali metal oxide, 10% to 18% $B_2O_3$, 2% to 4% alkaline earth metal oxide and the remainder substantially all $TiO_2$, $Mn_3O_4$, $Fe_2O_3$ and $Co_3O_4$.

9. A thermocouple comprising a metal housing, an insulator block within the upper end of said housing having a pair of electrical terminals secured therein, a metal tube forming the lower end of said housing and containing a tightly packed powdered insulating material, and a pair of metal wires electrically connected to said terminals extending through said insulating material and joined together externally thereof to form a heat sensitive junction, at least these portions of said wires within said insulating material being provided with a thin heat and corrosion resistant coating of vitreous material.

10. A thermocouple comprising a metal housing, an insulator block within the upper end of said housing having a pair of electrical terminals secured therein, a metal tube forming the lower end of said housing and containing a tightly packed powdered insulating material, and a pair of metal wires electrically connected to said terminals extending through said insulating material and joined together externally thereof to form a heat sensitive junction, those portions of said wires within said insulating material being provided with a thin heat and corrosion resistant coating of vitreous materials showing on analysis from about 40% to 50% $SiO_2$, 15% to 25% $Al_2O_3$, 10% to 15% alkali metal oxide, 10% to 18% $B_2O_3$, 2% to 4% alkaline earth metal oxide and the remainder substantially all $TiO_2$, $Mn_3O_4$, $Fe_2O_3$ and $Co_3O_4$.

11. A thermocouple comprising a metal housing, an insulator block within the upper end of said housing having a pair of electrical terminals secured therein, a metal tube forming the lower end of said housing and containing a tightly packed powdered insulating material, and a pair of metal wires electrically connected to said terminals extending through said insulating material and joined together externally thereof to form a heat sensitive junction, at least these portions of said wires external of said insulating material being provided with a thin heat and corrosion resistant coating of vitreous material, said vitreous material showing on analysis from about 40% to 50% $SiO_2$, 15% to 25% $Al_2O_3$, 10% to 15% alkali metal oxide, 10% to 18% $B_2O_3$ and 2% to 4% alkaline earth metal oxide.

References Cited in the file of this patent
UNITED STATES PATENTS
2,757,220    Carter _____ July 31, 1956